US007888421B2

(12) United States Patent
Schöley et al.

(10) Patent No.: US 7,888,421 B2
(45) Date of Patent: Feb. 15, 2011

(54) CONTINUOUS PROCESS FOR PRODUCING CROSSLINKABLE ORGANOPOLYSILOXANE COMPOSITIONS

(75) Inventors: Peter Schöley, Diera-Zehren (DE); Uwe Scheim, Coswig (DE); Steffen Lau, Nünchritz (DE)

(73) Assignee: Wacker Chemie AG, Munich (DE)

(*) Notice: Subject to any disclaimer, the term of this patent is extended or adjusted under 35 U.S.C. 154(b) by 504 days.

(21) Appl. No.: 11/782,714

(22) Filed: Jul. 25, 2007

(65) Prior Publication Data
US 2008/0033100 A1 Feb. 7, 2008

(30) Foreign Application Priority Data
Aug. 3, 2006 (DE) .................. 10 2006 036 303

(51) Int. Cl.
*C08L 83/04* (2006.01)
(52) U.S. Cl. .................. 524/506; 524/425; 524/401; 528/14
(58) Field of Classification Search .................. 524/425, 524/401, 506; 528/14
See application file for complete search history.

(56) References Cited

U.S. PATENT DOCUMENTS

| 3,194,540 | A | 7/1965 | Hager et al. |
| 4,737,561 | A | 4/1988 | Stary et al. |
| 6,218,495 | B1* | 4/2001 | Braun et al. .................. 528/14 |
| 2001/0041767 | A1* | 11/2001 | Frankoski et al. ........... 524/588 |
| 2004/0006173 | A1* | 1/2004 | Hierstetter et al. .......... 524/588 |

FOREIGN PATENT DOCUMENTS

| DE | 101 46 395 B4 | 9/2005 |
| EP | 0 234 226 B1 | 4/1992 |
| EP | 0 688 598 B1 | 1/1998 |
| EP | 1 008 613 A2 | 6/2000 |
| EP | 0 739 652 B1 | 5/2001 |
| EP | 0 940 445 B1 | 9/2001 |
| EP | 1 375 567 A1 | 1/2004 |
| WO | WO-02/44247 A2 | 6/2002 |

OTHER PUBLICATIONS

Patbase abstract is corresponding to DE 101 46 395 B4.
US 4,737,561 is corresponding to EP 0 234 226 B1.
US 6,218,495 B1 is corresponding to EP 0 940 445 B1.
US 2004/0006173 A1 is corresponding to EP 1 375 567 A1.

* cited by examiner

*Primary Examiner*—Michael M Bernshteyn
(74) *Attorney, Agent, or Firm*—Brooks Kushman P.C.

(57) ABSTRACT

RTV-1 compositions are continuously produced from essentially linear organosilicon compounds having at least two condensable groups bound to silicon, filler and, optionally, further constituents, by mixing in one step in a single pass through the mixing zone of a rotor-stator mixer, wherein the pressure at the outlet of the mixing apparatus is at least 100 hPa greater than that at the inlet of the mixing apparatus.

14 Claims, 1 Drawing Sheet

CONTINUOUS PROCESS FOR PRODUCING CROSSLINKABLE ORGANOPOLYSILOXANE COMPOSITIONS

BACKGROUND OF THE INVENTION

1. Field of the Invention

The invention relates to a process for the continuous production of room-temperature-crosslinkable organopolysiloxane compositions in a mixer having a mixing zone comprising a rotor-stator system.

2. Description of the Related Art

One-component organopolysiloxane compositions which can be stored with exclusion of moisture and crosslink at room temperature on admission of moisture, known as RTV-1 compositions, have been known for a long time.

Various methods of producing RTV-1 compositions have been described. Owing to their high productivity, continuous processes are particularly preferred. Such processes exhibit compounding problems, however, for example the continuous and homogeneous mixing of fillers into the highly viscous polymer components, particularly when the fillers are reinforcing fillers having large surface areas. The mixture should be produced in such a way that no relatively large filler particles are visible in the finished product. A further difficulty is presented by water necessarily introduced with the fillers. When the mixture is not completely homogeneous, even days after production of the mixture, inhomogeneities may be formed by crosslinking of the RTV-1 mixture around the filler particles which have not been homogeneously admixed due to local high concentrations of water. Thus, for example in EP-B-234 226, parts of the constituents are combined in a continuously operating closed mixer in a first step, and in a second step, the remaining constituents are introduced in a reciprocating kneader and the composition is homogenized in this kneader. To allow reaction times between the individual mixing steps, a further three-stage process was developed as described in EP-B-940 445. EP-B-739 652 describes a process which makes do without such a reaction time but indicates that the water present in the mixture which has been introduced via the raw materials has to be removed in a step following the production of the mixture. Since water can still be detected in the compositions, the mixing in of the fillers by means of the apparatus is obviously unsatisfactory. The mixture contains incompletely wetted filler particles in which the water is located. If mixing is complete, then the water reacts irreversibly with the crosslinker and would thus no longer be able to be detected.

A further process described in EP-B-688 598 utilizes a specially constructed mixer which comprises two mixing chambers and in which a mixture of liquids and a powder is firstly produced in a first, upper mixing chamber and the mixture is then strongly sheared again to homogenize it by means of a second independent mixing apparatus, further liquid components being mixed in the second, lower mixing chamber.

EP-A-1 008 613 describes the use of a mixing turbine having axial flow. This mixing turbine was previously used in EP B 234 226 in combination with a reciprocating kneader. The mixing results obtained by means of such a mixer are excellent, but a significant disadvantage is that this type of mixer is not self-cleaning, i.e. coatings of filler and liquid build up in the interior of the mixer and after more than 24 hours of operation lead to a deterioration in the sealant quality due to filler particles. This problem can generally be solved only by frequent cleaning of the mixing turbine.

U.S. Pat. No. 3,194,540 discloses mixers which operate according to the rotor-stator principle. Such mixers are utilized both for emulsion production and for mixing of solids into liquids. In these apparatuses, a rotor rotates within a stationary stator. The stator has slits which can have a variable width. The rotor can likewise have slits of this type which can be supplemented by evolute-shaped transport elements. It is also possible for only the transport elements to be present. The rotor sucks the material in and flings it radially outward through any slits it may have and the slits of the stator. The stator teeth which bound these slits act as an impingement surface, and the gap between rotor and stator leads to shear. These mixers are generally constructed so that up to three rotor-stator pairs can be installed in series, in each case with different slit widths. The more demanding the dispersion task, the more tools having narrower slit widths are installed. DE-B 101 46 395 discloses, for example, a mixing system of this type for producing water-free RTV-1 compositions based on polydiorganosiloxanes. However, a disadvantage of the process is that it is relatively inflexible and cannot quickly be adapted to altered mixing tasks.

SUMMARY OF THE INVENTION

The invention provides a process for the continuous production of RTV-1 compositions, in which an essentially linear organosilicon compound having at least two condensable groups bound to silicon (A), filler (B) and, if appropriate, further constituents, are mixed together in one step in a single pass through the mixing zone of a mixer which comprises a rotor-stator system, wherein the pressure at the outlet of the mixing apparatus is at least 100 hPa greater than that at the inlet of the mixing apparatus.

DETAILED DESCRIPTION OF THE PREFERRED EMBODIMENTS

Figure 1:
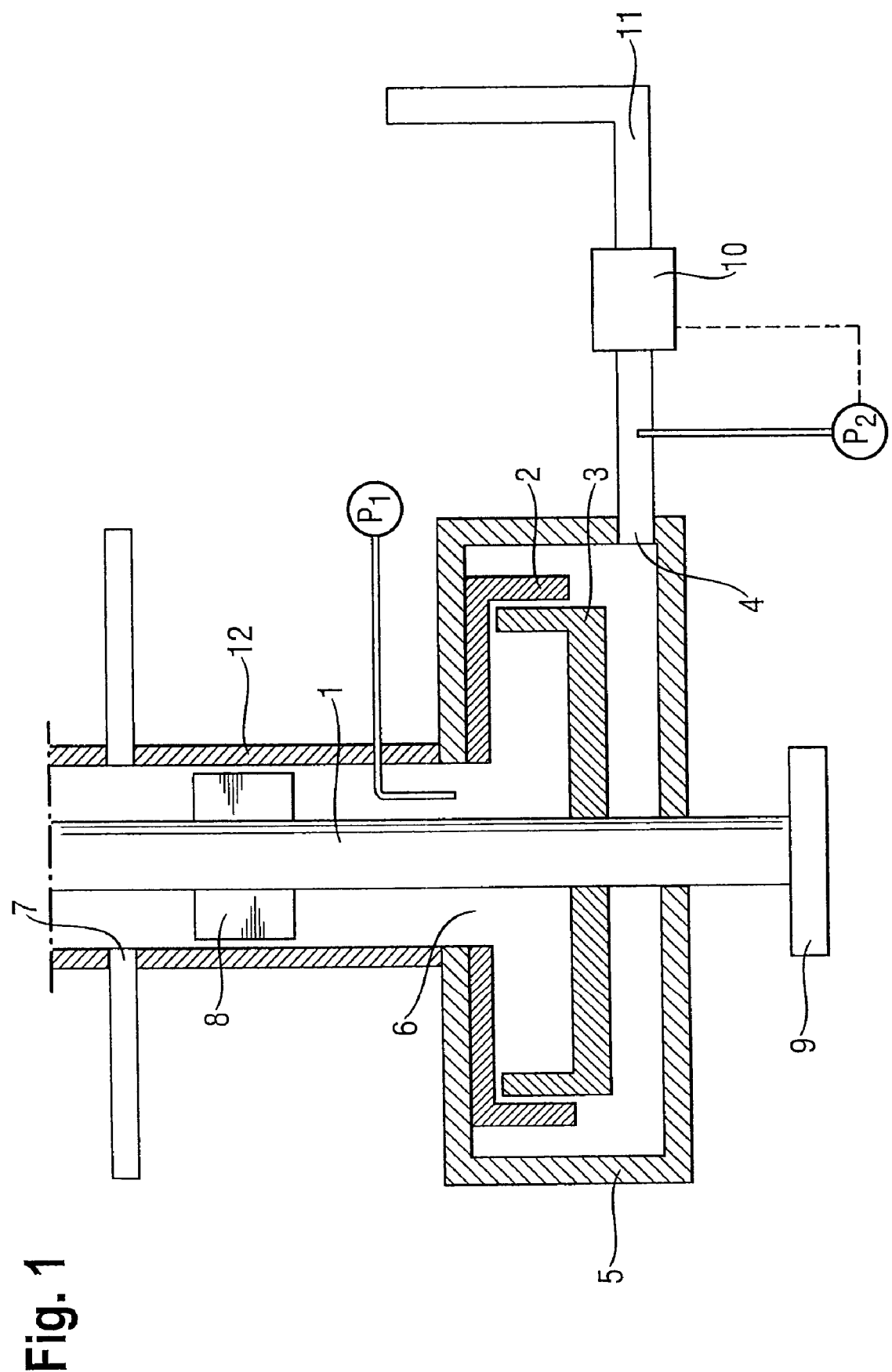
FIG. 1 illustrates in cross-section one embodiment of a mixer of the present invention.

For the purposes of the present invention, the expression "condensable" radicals also encompasses radicals which include an optionally preceding hydrolysis step.

The introduction of organosilicon compound (A), filler (B) and any further constituents is preferably effected at the pressure of the surrounding atmosphere, i.e. in the range from about 900 to 1100 hPa, more preferably from 950 to 1050 hPa.

In the process of the invention, the components are preferably fed from above in free fall via an inlet opening onto the rotating rotor, with the components being able to be introduced individually or as any premixes. For example, organosilicon compound (A) can have been premixed with part of any further constituents of the mixture which may be used and be fed together with solid (B) and, if appropriate, further constituents of the mixture onto the rotating rotor. The inlet opening preferably has a diameter of more than 10 cm, more preferably from 20 to 200 cm. The diameter of the rotor is preferably greater than 10 cm, more preferably from 15 to 200 cm, and should always be greater than the diameter of the inlet opening. The rotor and stator can have any desired number of teeth and slits of any size and shape. Preference is given to more than 5 teeth having a height of at least 1 cm and slits having a width of not more than 5 cm. Rotors having evolute-shaped transport elements are also preferred. It is also possible for a plurality of rotor-stator pairs to be arranged in series.

It can be advantageous for organosilicon compound (A), if appropriate in admixture with further constituents apart from (B), to be fed in through a plurality of lateral openings of a preferably cylindrical superposed fitting and to flow downward on the inside of the wall. At the bottom end of the superposed fitting, component (A) then falls onto the rotor. The filler (B) is preferably directed from above in the axial direction onto the rotor by the cylindrical superstructure.

In a preferred embodiment of the process of the invention, mixing elements which effect prewetting of the filler (B) with organosilicon compound (A) and, if appropriate, further constituents of the mixture, can be arranged on a rotating shaft above the rotor. The mixing elements are preferably configured so that the filler (B) is at the same time conveyed in the direction of the rotor.

The centrifugal forces produced by the rotor fling the mixture outward onto the teeth of the stator and push it through the slits. The rotor preferably comprises transport elements, more preferably evolute-shaped transport elements, so that additional flow through the slits in the direction of the outlet opening results. The speed of rotation of the rotor can also be independent of the speed of rotation of the mixing or transport elements if the rotor is arranged on a different rotating shaft from that on which the mixing and transport elements are arranged. However, the speed of rotation of the rotor is preferably the same as the speed of rotation of the transport elements, and particular preference is given to the mixing and transport elements being fixed on one shaft.

In the process of the invention, the mixture is discharged via the outlet opening through a discharge line adjoining the outlet opening. The discharge line can be, for example, a pipe or a hose.

In the process of the invention, the pressure at the outlet of the mixing apparatus is preferably at least 200 hPa, and more preferably from 300 hPa to 3000 hPa greater than at the inlet of the mixing apparatus. The pressure difference can be achieved in a variety of known ways, e.g. by building up a hydrostatic pressure, changes in the cross section of the discharge line, variation of the rotational speed of the rotor, and control of the output of transport devices in the discharge line.

The pressure difference between inlet opening and outlet opening of the mixing apparatus is preferably achieved at a constant rotational speed of the rotor by the free downflow of the mixture into the discharge line being opposed by an appropriately greater resistance. As a result, the mixture conveyed by the rotating rotor presses onto the mixture in the discharge line. At a constant speed of rotation of the rotor, the resistance against free downflow of the mixture from the outlet opening of the mixing apparatus which is necessary for building up the pressure can be obtained, for example, by the discharge line through which the mixture moves being configured by appropriate selection of the diameter, the cross section, the length and, if appropriate, the physical rise so that the necessary pressure difference between the inlet opening and the outlet opening is obtained.

Adapting to altered mixing tasks, as occur, for example, in the case of a product change, is, however, very difficult to carry out in the case of the simple embodiment of a physical rise of the outlet line. For this reason, a further embodiment according to the invention comprises, for example, constriction of the discharge line by means of orifice plates. These can, if desired, be permanently attached in graduated size to the discharge line or be installed in an exchangeable fashion downstream of the outlet opening. Preference is given to reductions in the cross section of the discharge line which can be altered quickly, e.g. valves, and preferably, ball valves which may be electronically controlled.

Particular preference is given to electronically controlled transport devices such as gear pumps or screw conveyors installed in the discharge line which adjust their output volume so that the desired pressure is present at the outlet opening. However, the mixing time and intensity can be controlled not only by altering the discharge resistance but also by regulating the rotational speed of the rotor.

The rotational speed of the rotor is preferably matched to the mixing task and is preferably in the range from 200 to 3000 revolutions per minute.

The selection of rotational speed is particularly advantageous when specific rheological properties of the mixture of component (A) and wetted but not yet completely dispersed finely divided solid (B), and optionally further constituents and gaseous components such as air or inert gas introduced, for example, with the solid (B), make the mixing task difficult to carry out, since these 3 phase mixtures display not only non-Newtonian but sometimes also dilatant flow.

The solution to the mixing problem surprisingly lies, for example, in the fact that a reduction in the rotational speed of the rotor in an otherwise unchanged system leads to a higher pressure difference between feed opening and discharge opening.

Of course, it is possible in non-inventive embodiments to attempt to alter the duration and intensity of mechanical stress on the mixture by applying a vacuum to the outlet opening or by increasing the pressure at the inlet opening, but the fillers are then generally not dispersed sufficiently well.

The process of the invention is preferably carried out at temperatures of from −20 to 180° C., more preferably from 10 to 80° C. However, it can also be carried out at higher or lower temperatures, with the temperature being dependent on the input of mixing energy. If desired, the materials being mixed can be cooled or heated in any desired manner before, during, and/or after the mixing process.

In the process of the invention, the mixture obtained at the end of the discharge line can be degassed and freed of volatile constituents in a subsequent step under low shear and under reduced pressure, e.g. 10 hPa. The product obtained in this way can then, if desired, be dispensed into containers such as cartridges, hobbocks and drums, or large containers which prevent ingress of moisture.

The condensable groups on the organosilicon compounds (A) participating in the crosslinking reaction can be any groups, e.g. hydroxy, acetato, oximato, amino, or organyloxy groups. The component (A) can be any organosilicon compounds which have at least two Si-bonded condensable groups suitable for compositions which can be crosslinked by means of a condensation reaction. They can be either pure siloxanes, i.e. Si—O—Si structures or silcarbanes, i.e. Si—R"—Si structures, where R" is a divalent hydrocarbon radical which may be substituted or interrupted by heteroatoms, or any copolymers having organosilicon groups.

The organosilicon compounds (A) used according to the invention are preferably compounds comprising units of the formula $$R_a Y_b SiO_{(4-a-b)/2} \quad (I),$$

where the radicals R can be identical or different and are substituted or unsubstituted hydrocarbon radicals which may be interruped by oxygen atoms, the radicals Y can be identical or different and are condensable radicals, a is 0, 1, 2 or 3, preferably 1 or 2, and b is 0, 1, 2 or 3, preferably 0, 1 or 2, particularly preferably 0, with the proviso that the sum a+b is less than or equal to 3 and at least two radicals Y are present per molecule. Component (A) is preferably composed of organopolysiloxanes consisting of units of the formula (I).

The radicals R are preferably monovalent hydrocarbon radicals which have from 1 to 18 carbon atoms and may be substituted by halogen atoms, amino groups, ether groups, ester groups, epoxy groups, mercapto groups, cyano groups or (poly)glycol radicals, with the latter being made up of oxyethylene and/or oxypropylene units, more preferably alkyl radicals having from 1 to 12 carbon atoms, and in particular, the methyl radical. However, the radicals R can also be divalent radicals which, for example, connect two silyl groups with one another.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl radical and methylcyclohexyl radicals; alkenyl radicals such as the vinyl, 1-propenyl and 2-propenyl radicals; aryl radicals such as the phenyl, naphthyl, anthryl and phenanthryl radicals; alkaryl radicals such as the o-, m-, p-tolyl radicals, xylyl radicals, and ethylphenyl radicals; and aralkyl radicals such as the benzyl radical and the α- and β-phenylethyl radicals.

Examples of substituted radicals R are the methoxyethyl, ethoxyethyl and ethoxyethoxyethyl radicals and the chloropropyl and trifluoropropyl radicals.

Examples of divalent radicals R are the ethylene radical, polyisobutylenediyl radicals and propanediyl-terminated polypropylene glycol radicals.

The condensable groups Y which are borne by the organosilicon compounds (A) and which participate in the crosslinking reaction, can be hydroxyl radicals or any substituted or unsubstituted hydrocarbon radicals bound via an oxygen atom or nitrogen atom to a silicon atom. The radical Y is preferably a hydroxyl radical, an $OR^1$ radical such as a methoxy, ethoxy, n-propoxy, i-propoxy, n-butoxy, i-butoxy, s-butoxy, tert-butoxy or 2-methoxyethoxy radical, where $R^1$ is an unsubstituted or substituted hydrocarbon radical which may be interrupted by oxygen atoms, an acyloxy radical such as the acetoxy radical, an amino radical such as the methylamino, dimethylamino, ethylamino, diethylamino or cyclohexylamino radical, an amido radical such as the N-methylacetamido or benzamido radical, an aminoxy radical such as the diethylaminoxy radical, an oximo radical such as the methylethylketoximo or methylisobutylketoximo radical or an enoxy radical such as the 2-propenoxy radical.

Examples of radicals $R^1$ are the monovalent radicals indicated for R. The radical $R^1$ is preferably an alkyl radical having from 1 to 12 carbon atoms, more preferably the methyl or ethyl radical.

The radical Y is preferably a hydroxyl radical, an $—OR^1$ radical where $R^1$ is as defined above, or an acyloxy radical, in particular an acetoxy, methoxy or ethoxy radical.

Organosilicon compounds (A) are particularly preferably compounds of the formulae

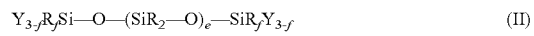

(II)

and

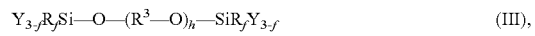

(III), where the radicals R and Y can in each case be identical or different and have one of the abovementioned meanings, the radicals $R^3$ can be identical or different and are divalent, substituted or unsubstituted hydrocarbon radicals, e is from 30 to 3000, f is 0, 1 or 2 and h is from 30 to 1000. In the above formulae, f is preferably 2 when Y is —OH, and f is preferably 1 or 0 when Y is different from —OH.

Examples of radicals $R^3$ are alkylene radicals such as the methylene, ethylene, n-propylene, isopropylene, n-butylene, iso-butylene, tert-butylene, n-pentylene, isopentylene, neopentylene, tert-pentylene, hexylene, heptylene, octylene, nonylene, decylene, dodecylene, and octadecylene radicals; cycloalkylene radicals such as the cyclopentylene radical, alkenylene radicals such as the vinylene, n-hexenylene, cyclohexenylene, 1-propenylene, allylene, butenylene and 4-pentenylene radicals; alkynylene radicals such as the ethynylene and propargylene radicals; arylene radicals such as the phenylene, naphthylene, anthrylene and phenanthrylene radicals; alkarylene radicals such as the o-, m-, and p-tolylene radicals, xylylene radicals and ethylphenylene radicals; and aralkylene radicals such as the benzylene radical, and the α- and β-phenylethylene radicals; with alkylene radicals being preferred, and with the ethylene and propylene radicals being particularly preferred.

Examples of organosilicon compounds (A) are

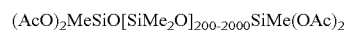

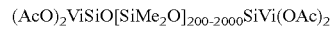

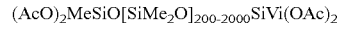

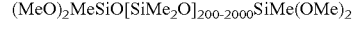

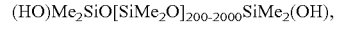

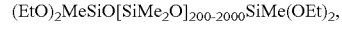

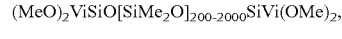

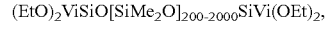

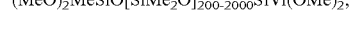

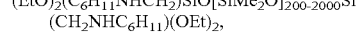

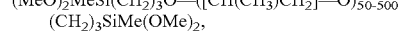

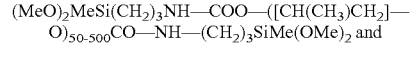

and

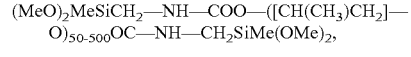

where Ac is the acetyl radical, Me is the methyl radical, Et is the ethyl radical and Vi is the vinyl radical.

The organosilicon compounds (A) preferably have a viscosity of from 100 to $10^6$ mPas, more preferably from $10^3$ to 350,000 mPas, in each case at 25° C. The organosilicon compounds (A) are commercial products or can be prepared by methods customary in silicon and carbon chemistry.

Examples of fillers (B) are nonreinforcing fillers having a BET surface area of up to 10 $m^2/g$, e.g. milled calcium carbonates, partially reinforcing fillers having a BET surface area of more than 10 $m^2/g$, e.g. precipitated calcium carbonates, or reinforcing fillers, i.e. fillers having a BET surface area of more than 50 $m^2/g$, e.g. pyrogenic silica, precipitated silica, carbon blacks such as furnace black and actylene black, and silicon-aluminum mixed oxides having large BET surface areas.

The fillers (B) may have been hydrophobicized by known methods, for example by treatment with organosilanes or organosiloxanes or with stearic acid or by etherification of hydroxyl groups to form alkoxy groups. The filler (B) is preferably calcium carbonate or pyrogenic silica.

Preference is given to using from 5 to 300 parts by weight, more preferably from 8 to 200 parts by weight, and in particular from 10 to 150 parts by weight of filler (B), in each case based on 100 parts by weight of component (A), in the process of the invention.

It is possible, if desired, to use crosslinkers (C) in the process of the invention. These can be any previously known cross-linkers having at least three condensable radicals, for example silanes or siloxanes having at least three organyloxy groups.

The crosslinkers (C) optionally used are preferably organosilicon compounds of the formula

$$Z_c SiR^2_{(4-c)} \quad \text{(IV)},$$

where the radicals $R^2$ can be identical or different and are monovalent, substituted or unsubstituted hydrocarbon radicals which may be interrupted by oxygen atoms, the radicals Z can be identical or different and have the meanings given above for Y with the exception of the hydroxyl group and c is 3 or 4, and also their partial hydrolyzates.

The partial hydrolyzates can be partial homohydrolyzates, i.e. partial hydrolyzates of one type of organosilicon compound of the formula (IV), or partial cohydrolyzates, i.e. partial hydrolyzates of at least two different types of organosilicon compounds of the formula (IV). Although not indicated in formula (IV), the organosilicon compounds can, as a result of their preparation, have a small proportion of hydroxyl groups, preferably up to a maximum of 5% of all Si-bonded radicals. When the crosslinkers (C) are partial hydrolyzates of organosilicon compounds of the formula (IV), those having up to 10 silicon atoms are preferred.

Examples of radicals $R^2$ are the examples given above for radical R, with hydrocarbon radicals having from 1 to 12 carbon atoms being preferred and the methyl and vinyl radicals being particularly preferred.

Examples of Z are the examples given for Y with the exception of the hydroxyl group. Z is preferably an $-OR^1$ radical, where $R^1$ has one of the above-mentioned meanings, an acyloxy radical or an oximo radical.

The crosslinkers (C) are preferably tetramethoxysilane, tetraethoxysilane, tetrapropoxysilane, tetrabutoxysilane, methyltrimethoxysilane, methyltriethoxysilane, vinyltrimethoxysilane, vinyltriethoxysilane, phenyltrimethoxysilane, phenyltriethoxysilane, 3-cyanopropyltrimethoxysilane, 3-cyanopropyltriethoxysilane, 3-(glycidoxy)propyltriethoxysilane, 1,2-bis(trimethoxysilyl)ethane, cyclohexylaminomethyltriethoxysilane, morpholinomethyltrimethoxysilane, 1,2-bis(triethoxysilyl)ethane, methyltris(methylethylketoximo)silane, vinyl-tris(methylethylketoximo) silane, tetrakis(methylethylketoximo)silane, methyltriacetoxysilane, ethyltriacetoxysilane, vinyltriacetoxysilane, dimethyldiacetoxysilane, methylvinyldiacetoxysilane and partial hydrolyzates of the organosilicon compounds mentioned above, e.g. hexaethoxydisiloxane.

The crosslinkers (C) are more preferably tetramethoxysilane, tetraethoxysilane, tetrapropoxysilane, methyltrimethoxysilane, methyltriethoxysilane, vinyltrimethoxysilane, vinyltriethoxysilane, phenyltrimethoxysilane, 1,2-bis(trimethoxysilyl)ethane, 1,2-bis(triethoxysilyl)ethane, methyltris(methylethylketoximo)silane, vinyltris(methylethylketoximo)silane, methyltriacetoxysilane, ethyltriacetoxysilane, vinyltriacetoxysilane and their partial hydrolyzates, in particular methyltrimethoxysilane, vinyltrimethoxysilane, methyltriethoxysilane, vinyltriethoxysilane, methyltris(methylethylketoximo)silane, vinyltris(methylethylketoximo)silane, methyltriacetoxysilane, ethyltriacetoxysilane, vinyltriacetoxysilane and their partial hydrolyzates.

The crosslinkers (C) are commercial products or can be prepared by methods known in silicon chemistry. If crosslinkers (C) are used, which is preferred, they are preferably used in amounts of from 0.01 to 20 parts by weight, more preferably from 0.5 to 10 parts by weight, and in particular from 3 to 8 parts by weight, in each case based on 100 parts by weight of organosilicon compound (A).

In addition to the above-described components (A), (B) and (C), it is possible to use any further substance useful in compositions which crosslink by means of a condensation reaction, e.g. unreactive silicone oils, organic plasticizers, solid or liquid silicone resins, adhesion promoters, catalysts, water scavengers, stabilizers which, for example, influence the storage stability and reactivity of the mixture, additives which optimize the properties of the as yet uncured or the cured material, substances which control the reactivity of the composition, color pigments, heat stabilizers and fungicides. The additives (D) are preferably catalysts, adhesion promoters, plasticizers, stabilizers, rheology additives, color pigments and fungicides. The additives (D) can also, if desired, be mixed in a further, subsequent process step. All constituents of the mixture can also, if desired, be mixed in two or more portions at various points in time and, if appropriate, in premixes.

The components used in the process of the invention can in each case be one type of such a component or a mixture of at least two types of a respective component.

A particularly preferred embodiment of the process of the invention is illustrated in FIG. 1. A premix of components (A), crosslinker (C) and additives (D), e.g. various plasticizers, and filler (B) are metered into a rotor-stator mixing apparatus (5) via the inlet (6), with the premix being introduced via a plurality of lateral openings (7) of a preferably cylindrical superposed fitting (12) and then flow downward on the inside of the wall. At the lower end of the superposed fitting, the inlet opening (6), the premix then drops onto the rotor (3). The rotor (3) is rotated by means of the rotor shaft (1), on which mixing elements (8) are located and is driven by the drive (9). The filler (B) travels from the top through the cylindrical superstructure (12) onto the rotor. At appropriately large amounts of filler and high rotational speeds of the rotor, the free fall of the filler can be hindered. In this case, the filler slides downward in a manner which is likewise according to the invention. The mixing elements preferably have a rectangular shape and are arranged at an angle of preferably 30-45° to the rotor shaft in the direction of rotation. This results in simultaneous transport of the filler in addition to the free fall in the direction of the rotor. During the downward motion of the filler, prewetting of the filler (B) with the premix is brought about by the mixing elements (8). The mixing tools of the mixing apparatus (5) comprise the stator (2), which has cutouts, preferably comb-like cutouts, and the rotor (3), which has cutouts, in particular comb-like cutouts, and/or possesses transport elements, in particular evolute-shaped transport elements. There is a gap between the stator (2) and the rotor (3). Component (A), crosslinker (C), plasticizer (D) and filler (B) are mixed by the rotor (3) and pushed through the cutouts on the rotor (3) and the stator (2), resulting in the mixture being strongly sheared. On its way to the outlet opening (4), no further mixing energy is introduced into the product. Downstream of the outlet opening (4), there is the discharge line (11) having a construction for establishing flow resistance and, if appropriate, having additional inventive engineering devices (10) for increasing the flow resistance. The measurement of the pressures is effected at the inlet opening by means of the pressure gage (P1) and at the outlet opening (4) by means of the pressure gage (P2).

The process of the invention has the advantage that RTV-1 compositions having great homogeneity with respect to admixing filler can be produced, and that RTV-1 compositions having excellent storage stability can be produced. The process has the further advantages that mixing intensity can be adapted very precisely to quickly changing mixing tasks; that different raw material grades of filler can be processed with high flexibility, for example strongly agglomerated material; and that the degree of dispersion of the filler can be set in a highly targeted manner.

In the examples described below, all percentages are by weight, unless indicated otherwise. Furthermore, all viscosity figures are based on a temperature of 25° C. Unless indicated otherwise, the examples below are carried out at a pressure of the surrounding atmosphere, i.e. at about 1000 hPa, and room temperature, i.e. at about 20° C., or at a temperature which is established on combining the reactants at room temperature without additional heating or cooling. The Shore A hardness is determined with DIN (Deutsche Industrie Norm) 53505.

EXAMPLE 1

Per hour, 1000 kg of a mixture of 71% of a polydimethylsiloxane which has randomly distributed diacetoxymethylsilyl end groups and diacetoxyvinylsilyl end groups in a molar ratio of about 1:2 and has a viscosity of 80,000 mPas, 23.5% of an α,ω-bis(trimethylsiloxy)polydimethylsiloxane having a viscosity of 1000 mPas and 5.5% of an oligomer mixture of acetoxysilanes (commercially available under the trade name "Vernetzer ES 2411 from Wacker Chemie AG, D-Munich) and 62 kg/h of a pyrogenic silica having a BET surface area of 150 m²/g (commercially available under the trade name HDK® V 15 from Wacker Chemie AG, D-Munich) were metered in free fall into a rotor-stator mixing apparatus (5) via 4 lateral openings (7) in a cylindrical superstructure (12). The rotor (3) had 6 evolute-shaped transport elements and 6 mixing blades located on the shaft. It was operated at 1200 revolutions per minute. The stator is provided with comb-like cutouts, i.e. with 42 teeth which have a width of 13 mm and a spacing of 9 mm. It has an internal diameter of 275 mm.

On the way to the outlet opening (4), no further mixing energy was introduced into the product. Pressure gages are installed at the inlet opening (6) and in the discharge line about 20 cm downstream of the outlet opening. The pressure (P1) at the inlet opening was that of the surrounding atmosphere of 1000 hPa. A ball valve (10) installed in the discharge line downstream of the pressure gage was closed manually until a pressure (P2) of 1500 hPa was established at the outlet opening (4).

The mixture leaving the discharge line (11) was introduced without further transport devices into a twin-screw kneader where it was continuously deaerated and degassed. At the same time, per hour, 1000 kg of the product were continuously mixed with 0.5 kg/h of a mixture of 20% of dibutyltin diacetate and 80% of an organic plasticizer in the twin-screw kneader.

Finally, the finished composition was packed in drums which did not allow ingress of moisture, and at the same time PE cartridges which did not allow ingress of moisture were filled from a lateral port for test purposes.

A homogeneous mixture which remains homogeneous even on storage for a number of months in a 300 ml PE cartridge was obtained. No inhomogeneities are formed as a result of local crosslinking of the mixture.

To assess the appearance, the compositions were each applied in an about 0.1 mm thick layer to a glass plate:

Grade 1: free of specks

Grade 2: a few small specks

Grade 3: numerous specks

Determination of the expression rate was carried out from 310 ml PE cartridges under a pressure of 6.2 bar and at a nozzle diameter of 3.0 mm. The appearance of the mixture was satisfactory. The results are shown in Table 1. The composition formed a skin after 20 minutes at 23° C. and a relative atmospheric humidity of 50%, and cured within 7 days to give a rubbery-elastic material having a Shore A hardness of 18.

EXAMPLE 2

Example 1 was modified by installing a gear pump which was electronically controlled via the pressure measurement (P2) so that a pressure of 1800 hPa prevailed at the outlet opening, instead of the ball valve in the discharge line having a diameter of 50 mm. At the same rotational speed of the rotor, the throughput was reduced to 800 kg/h, with the percentages of the constituents of the mixture based on the amounts metered in remaining constant.

The appearance of the composition is improved. The results are shown in Table 1. The composition formed a skin after 20 minutes at 23° C. and a relative atmospheric humidity of 50% and cured within 7 days to give a rubbery-elastic material having a Shore A hardness of 18.

EXAMPLE 3

Example 1 was modified by reducing the rotational speed of the rotor to 800 min$^{-1}$ and regulating the pressure (P2) at the outlet opening to 1800 hPa. The throughput was increased to 1200 kg/h, with the percentages of the constituents of the mixture based on the amounts metered in remaining constant.

The appearance of the composition is improved further compared to the examples above (Table 1).

TABLE 1

| Example | Rotational speed of the rotor (rpm) | Throughput (kg/h) | Pressure difference (hPa) | Appearance | Expression rate (g/min) |
|---|---|---|---|---|---|
| 1 | 1200 | 1000 | 500 | 3 | 380 |
| 2 | 1200 | 800 | 800 | 2 | 360 |
| 3 | 800 | 1200 | 800 | 1 | 370 |

The composition formed a skin after 20 minutes at 23° C. and a relative atmospheric humidity of 50% and cured within 7 days to give a rubbery-elastic material having a Shore A hardness of 18.

EXAMPLE 4

Example 1 was repeated using a polydimethylsiloxane which has a viscosity of 80,000 mPa·s and is terminated by randomly distributed dimethoxymethylsilyl and dimethoxyvinylsilyl groups in a molar ratio of about 1:1 instead of the polydimethylsiloxane having diacetoxymethylsilyl end groups and diacetoxyvinylsilyl end groups. The results are shown in Table 2.

The composition formed a skin after 25 minutes at 23° C. and a relative atmospheric humidity of 50% and cured within 7 days to give a rubbery-elastic material having a Shore A hardness of 20.

EXAMPLE 5

Example 4 was repeated at a total throughput of 800 kg/h, with a pressure of 1800 hPa being set at the outlet opening by means of an electronically controlled discharge pump. The results are shown in Table 2.

The composition formed a skin after 25 minutes at 23° C. and a relative atmospheric humidity of 50% and cured within 7 days to give a rubbery-elastic material having a Shore A hardness of 20.

TABLE 2

| Example | Rotational speed of the rotor (rpm) | Throughput (kg/h) | Pressure difference (hPa) | Appearance | Expression rate (g/min) |
|---|---|---|---|---|---|
| 4 | 1200 | 1000 | 500 | 3 | 450 |
| 5 | 1200 | 800 | 800 | 2 | 440 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the continuous production of moisture-curable RTV-1 compositions, in which (A) an essentially linear organosilicon compound having at least two condensable groups bound to silicon, (B) filler and, optionally, further constituents are mixed together in one step in a single pass through the mixing zone of a mixer which comprises a rotor-stator mixing apparatus having a rotor which rotates within a stator having side walls, and slings the composition against the side walls of the stator by centrifugal force, the composition passing through slits in the side walls of the stator, wherein the pressure at the outlet of the mixing apparatus is at least 100 hPa greater than that at the inlet of the mixing apparatus.

2. The process of claim 1, wherein the pressure at the outlet of the mixing apparatus is at least 200 hPa greater than that at the inlet of the mixing apparatus.

3. The process of claim 1, wherein the pressure at the outlet of the mixing apparatus is from 300 to 3000 hPa greater than that at the inlet of the mixing apparatus.

4. The process of claim 1, wherein the organosilicon compounds (A) are compounds comprising units of the formula $$R_a Y_b SiO_{(4-a-b)/2}$$

where
the radicals R are identical or different and are substituted or unsubstituted hydrocarbon radicals optionally interrupted by oxygen atoms,
the radicals Y are identical or different and are condensable radicals,
a is 0, 1, 2 or 3 and
b is 0, 1, 2 or 3,
with the proviso that the sum of a+b is less than or equal to 3 and at least two radicals Y are present per molecule.

5. The process of claim 1, wherein the filler (B) comprises calcium carbonate, pyrogenic silica, or a mixture thereof.

6. The process of claim 1, wherein (C) a crosslinker is added to the composition.

7. The process of claim 1, wherein (D) additives selected from the group consisting of catalysts, adhesion promoters, plasticizers, stabilizers, rheology additives, color pigments and fungicides are present in the mixture.

8. The process of claim 1, wherein the filler comprises a reinforcing filler having a BET surface area is greater than 50 m²/g.

9. The process of claim 8, wherein at least one reinforcing filler is selected from the group consisting of pyrogenic silica, precipitated silica, carbon black, and silicon-aluminum mixed oxides.

10. The process of claim 8, wherein the filler further comprises a non-reinforcing filler having a BET surface area of less than or equal to 10 m²/g.

11. The process of claim 8, wherein the filler further comprises a partially reinforcing filler having a BET surface area of greater than 10 m²/g and less than 50 m²/g.

12. The process of claim 1, wherein the pressure before the rotor stator mixer is measured and the pressure after the rotor stator mixer is measured, and the pressure differential is adjusted to a set value by altering the output of the mixer.

13. The process of claim 12, wherein the pressure differential is adjusted by means of an adjustable valve in an outlet line of the rotor stator mixer.

14. The process of claim 12, wherein the pressure differential is adjusted by means of altering the pumping rate of a metering pump in an outlet line of the rotor stator mixer.

* * * * *